(12) United States Patent
Ingemann Hansen (10) Patent No.: US 12,158,370 B2
(45) Date of Patent: Dec. 3, 2024

(54) METHOD AND APPARATUS FOR USE IN THE WEIGHING AND BATCHING OF FOOD ARTICLES

(71) Applicant: Cabinplant A/S, Harby (DK)

(72) Inventor: Henning Ingemann Hansen, Odense SØ (DK)

(73) Assignee: Cabinplant A/S, Harby (DK)

( * ) Notice: Subject to any disclaimer, the term of this patent is extended or adjusted under 35 U.S.C. 154(b) by 535 days.

(21) Appl. No.: 17/438,059

(22) PCT Filed: Mar. 12, 2019

(86) PCT No.: PCT/EP2019/056157
§ 371 (c)(1),
(2) Date: Sep. 10, 2021

(87) PCT Pub. No.: WO2020/182298
PCT Pub. Date: Sep. 17, 2020

(65) Prior Publication Data
US 2022/0018705 A1    Jan. 20, 2022

(51) Int. Cl.
*G01G 19/393*    (2006.01)
*G01G 13/02*    (2006.01)
*G01G 19/34*    (2006.01)

(52) U.S. Cl.
CPC ......... *G01G 19/393* (2013.01); *G01G 13/026* (2013.01); *G01G 19/346* (2013.01)

(58) Field of Classification Search
CPC ... G01G 13/026; G01G 19/346; G01G 19/393
See application file for complete search history.

(56) References Cited

U.S. PATENT DOCUMENTS

| | | | | |
|---|---|---|---|---|
| 4,508,186 A * | 4/1985 | Sashiki | ................. | G01G 13/02 177/1 |
| 4,836,310 A * | 6/1989 | Yamano | ................. | G01G 19/42 177/1 |
| 7,790,990 B2 * | 9/2010 | Kieselhorst | .......... | G01G 19/393 177/25.18 |

(Continued)

FOREIGN PATENT DOCUMENTS

| EP | 1515125 A1 | 3/2005 |
|---|---|---|
| EP | 2141467 A1 | 1/2010 |
| JP | 2005106593 A | 4/2005 |

*Primary Examiner* — Randy W Gibson
(74) *Attorney, Agent, or Firm* — Joseph C. Zucchero; Carolyn S. Elmore; Elmore Patent Law Group, P.C.

(57) ABSTRACT

The number of articles in a weighing pan of a multihead weigher is to be determined. A set of weight distributions including a first weight distribution and a second weight distribution are defined. The first weight distribution representing a weight distribution of a first integer number of articles, and the second weight distribution representing a weight distribution of a second integer number of articles. The weight of the articles in the weighing pan is compared to the first weight distribution, and the second weight distribution respectively—the number of articles corresponding to the first integer number when the weight being inside said first weight distribution, and to the second integer number when the weight being inside said second weight distribution.

12 Claims, 5 Drawing Sheets

(56) References Cited

U.S. PATENT DOCUMENTS

| | | | |
|---|---|---|---|
| 7,952,036 B2* | 5/2011 | Kieselhorst | G01G 19/393 177/25.18 |
| 2010/0108404 A1* | 5/2010 | Kieselhorst | G01G 19/393 177/25.18 |

* cited by examiner

METHOD AND APPARATUS FOR USE IN THE WEIGHING AND BATCHING OF FOOD ARTICLES

The present specification relates to a method and a system for weighing and batching articles, specifically weighing and batching pieces of solid food products into batches with a certain number of pieces and with a certain weight.

Within industries such as the foodstuff industry, weighing and sorting machines have been described in publications such as U.S. Pat. Nos. 6,234,297, 6,015,049, WO 98/49892, U.S. Pat. Nos. 6,321,914, 5,526,437, 4,569,434, EP 0593126 and EP 0900601, all of which are hereby incorporated in the present specification by reference.

Industrially packed food products, such as pieces of poultry, are often packed in packages (batches) of approximately equal weight, independent of the number of pieces included in the package. Although individual solid food products such as chicken legs, varies in weight from piece to piece it is possible to obtain packages, which have approximately the same weight by varying the number of food products in the packages.

Typically, multihead weighing machines are used for the above purpose. Examples of multihead weighers are described in publications such as EP 3112825, EP 2670669 and DK 201500149.

A multihead weigher may comprise a receiving station wherein individual pieces of food products are randomly distributed among a number weighing systems (weighing pans).

A computer is then used to calculate the most favourable combination of weights to reach a target weight. Via a number of hoppers or receptacles, favourable combinations of food products are emptied into e.g. a bin or tray such that each batch of food products form a batch of approximately the same weight. However, in order to obtain approximately the same weight the number of food products may vary from batch to batch.

In many situations, it is advantageous for the consumer to be offered packages with not only a certain weight or weight interval, but also with a certain number of pieces of food products in the package.

The above object and advantages together with numerous other objects and advantages, which will be evident from the description of the present invention, are according to a first aspect of the present invention obtained by:

A method of weighing and batching articles such as solid food products, said method comprising:
providing a multihead weigher including
a feeder system having an inlet for receiving said articles and a plurality of outlets for discharging said articles,
a plurality of weighing pans, each of said weighing pans being positioned below a respective outlet of said plurality of outlets with an opening facing said respective outlet for receiving a portion of said articles,
said method further comprising:
defining a set of weight distributions including a first weight distribution and a second weight distribution, said first weight distribution representing a weight distribution of a first integer number of articles, and said second weight distribution representing a weight distribution of a second integer number of articles,
providing said articles and feeding said articles into said weighing pans by means of said feeding system such that each weighing pan receives said portion of said articles,
determining the weight of a first portion in a respective weighing pan,
determining the number of articles constituting said first portion by performing a comparison between the weight and said first weight distribution, and said second weight distribution respectively, the number of articles corresponding to said first integer number when the weight being inside said first weight distribution, and to said second integer number when the weight being inside said second weight distribution,
rejecting said first portion when the weight being outside said set of weight distributions,
releasing said first portion from said respective weighing pan for recycling or for batching said first portion into a batch when the weight being inside said set of weight distributions such that said batch having a number and weight of articles within defined weight and integer intervals.

The method is contemplated to be suitable for batching a wide range of solid food products, including meat and poultry products such as various cuts of meat which typically is sold in packages containing two or more pieces, e.g. chicken breasts, T-bone steaks, drumsticks, chicken legs, chicken wings, tenderloins, sirloins, ribeyes, chops etc. However, the object of the invention is not limited to meat cuts, but may as well be applied to other types of food products, which occur in integer numbers.

An integer number of articles refers to one article, two articles, three articles or four articles, and up to for example 10 articles or more depending on the kind of articles to be batched, and the size of the batch as well, i.e. a whole number of article(s).

Defining a set of weight distributions may include determining how many weight distributions there should be in the set of weight distributions, and also defining each weight distribution in the set of weight distributions.

The set of weight distributions may include a third weight distribution, and a fourth weight distribution and up to for example 10 weight distributions or more depending on the kind of articles to be batched, and the size of the batch as well.

The first weight distribution may be for one article, and the second weight distribution may be for two articles, i.e. in the case of one chicken leg, the weight distribution for one chicken leg defines how the weight of chicken legs is distributed in the population of chicken legs.

Correspondingly, in the case of two chicken legs, the weight distribution for two chicken legs defines how the combined weight of two chicken legs is distributed in the population of pairs of chicken legs. The combined weight refers to the weight of each of the two articles added together.

The first and second weight distributions are different.

The comparison of the measured weight with a weight distribution may include mapping the weight to one of the distributions in the set of distributions to determine which distribution includes the weight.

The comparison may be made with the third and fourth weight distribution as well, and sequence through all the weight distributions in the set of weight distribution, i.e. taking one after the other.

A weight distribution is a mathematical function that provides the probabilities of occurrence of different possible outcomes in an experiment (the function outputs a probability as a function of a weight).

Thus, a given weight distribution maps the coordinate-pairs of weight and probability with the weight as the abscissa, and the probability as the ordinate.

Correspondingly, each distribution $p_n(w)$ in the set of distributions is a function of weight w, and defined by the integer number n. For a given contents in a weighing pan, the weight w is the known factor, and the integer n is unknown and determined using the pre-defined distributions in the set of distributions.

A weight with a probability higher than a threshold (such as zero or 10%) for a distribution means that the integer number for that distribution corresponds to or equals the number of solid food products in the weighing pan.

Each weight distribution in the set of weight distributions may be a cumulative probability distribution or a non-cumulative probability distribution (probability density function).

A weight distribution may be theoretically or empirically determined. For example, the weight distribution for one article such as a chicken leg may be determined by weighing 1000 chicken legs, and count how many fall below a given weight. The cumulative probability distribution for the experiment typically has the weight along the abscissa axis, and the ordinate axis has the count of articles. Thus, for a given pair of coordinates, the ordinate tells the number of articles which weigh less than the weight of the abscissa.

The distribution may be normalized so that is sum up to 1.

The non-cumulative probability distribution may be found as the derivative of the cumulative probability distribution.

The weight distribution representing the weight of for example two articles may be determined empirically by taking 1000 sets of two articles and weighing each set, and determining how the weights are distributed in intervals.

Alternatively, the weight distribution representing the weight of for example two articles may be determined or defined as the product of two times the weight distribution of one article.

A weight distribution may be truncated such that above a certain weight, the point probability is zero, and below a certain weight the point probability may also be zero.

The distribution may be a uniform distribution, a bell shaped distribution or a truncated bell shaped distribution.

The comparison between the weight and a weight distribution may comprise determining the point probability of the weight for the first weight distribution and the second weight distribution such that it may be determined which distribution returns the highest probability for the weight.

A weight is inside a weight distribution when the point probability is greater than zero or above a threshold value such as 10% or 20%.

Alternatively, the weight may be said to be inside a weight distribution if the weight is above the minimum weight of the distribution and below the maximum weight of the distribution.

For a truncated distribution, the minimum weight is the weight for which the point probabilities of all weights smaller than the minimum weight are zero.

Similarly, the maximum weight is the weight for which the point probabilities of all weights greater than the maximum weight are zero.

Alternatively, the weight may be said to be within a distribution if it is not further than one standard deviation from the average weight. Instead of the standard deviation, other deviations may be used such as more than 50% away from the average (or another threshold value than 50% such as 40% or 60%).

A minimum weight, and a maximum weight may be defined for a distribution such that a weight being between the minimum and maximum weight is said to belong to the distribution.

The weight may be said to be outside a distribution if the point probability is zero or if the weight is smaller than the minimum weight or larger than the maximum weight.

There may be an overlap between the first weight distribution and the second weight distribution, i.e. for a given weight, both distributions return a probability for the weight, which is higher than zero.

Alternatively, if a minimum and maximum weight have been defined for each distribution, the overlap may result from the maximum weight of the first distribution being greater than the minimum weight of the second distribution, which otherwise have a maximum weight higher than the maximum weight of the first distribution.

In the case of an overlap, it may not be possible to determine how many pieces of solid food products are present in the weighing pan. Thus, it may be decided that the contents of the weighing pan is to be recycled.

A conditional operation such as an if-statement may be used in order to determine the number of solid food products in a weighing pan or if the contents of a weighing pan should be rejected.

According to a second aspect of the present invention the above objects and advantages are obtained by:

A multihead weigher for weighing and batching articles such as solid food products, said multihead weigher comprising:

a feeder system having an inlet for receiving said articles and a plurality of outlets for discharging said articles, a plurality of weighing pans, each of said weighing pans being positioned below a respective outlet of said plurality of outlets with an opening facing said respective outlet for receiving a portion of said articles, and each of said weighing pans having a weight for weighing said portion of said articles, a central controller having a database with a set of weight distributions including a first distribution and a second distribution, said first weight distribution representing a weight distribution of a first integer number of articles, and said second weight distribution representing a weight distribution of a second integer number of articles, said central controller being configured for determining the number of articles constituting said first portion by performing a comparison between the weight and said first weight distribution, and said second weight distribution respectively, the number of articles corresponding to said first integer number when the weight being inside said first weight distribution, and to said second integer number when the weight being inside said second weight distribution, a rejector for rejecting said first portion when the weight being outside said set of weight distributions, a releasing mechanism for releasing said first portion from said respective weighing pan for recycling or batching said first portion into a batch when the weight being inside said set of weight distributions such that said batch having a number of articles within defined weight and integer intervals.

According to a third aspect of the present invention the above objects and advantages are obtained by:

A method of weighing and batching articles such as solid food products within a target interval of articles and weights, said method comprising:
  providing a multihead weigher including
    a feeder system having an inlet for receiving said articles and a plurality of outlets for discharging said articles,
    a plurality of weighing pans,
    each of said weighing pans being positioned below a respective outlet of said plurality of outlets with an opening facing said respective outlet for receiving a portion of said articles,
  said method further comprising:
    providing said articles and feeding said articles into said weighing pans by means of said feeding system such that each weighing pan receives said portion of said articles,
    determining the weight of a first portion in a respective weighing pan,
    defining a set of weight distributions including a first distribution and a second distribution, each weight distribution of said set of weight distributions representing a weight distribution of a whole number of articles such as one article or two articles,
    rejecting said first portion when said weight falling outside said set of weight distributions,
    determining the number of articles constituting said first portion by mapping said weight to the number of articles by means of said set of weight distributions when said weight falling inside a weight distribution,
    releasing said first portion from said respective weighing pan for batching or recycling said first portion when said weight falling inside said set of weight distributions.

The weight may fall inside a distribution when the probability of the weight in that distribution is greater than a threshold such as 0%, 10% or 20%.

The mapping of a weight to a number of articles may include the function of determining the probability of the weight belonging to a distribution—or merely determining if a weight is inside or outside a weight distribution.

All of the distributions may be used in the mapping, and the number of solid food products in a weighing pan corresponds to the number of the weight distribution, which gives a probability of the weight being greater than zero (or 10% or 20%).

The probability may either be the point probability or the cumulative probability.

Instead of the probability, a comparison to the minimum and maximum values of each distribution may be used to determine which distribution the weight falls within.

A weight is said to belong to a distribution when that distribution returns a higher probability of that weight than any of the other distributions.

The above aspects will now be explained in more detail below by means of examples of embodiments with reference to the drawings, in which.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Thus, like elements will not be described in detail with respect to the description of each figure.

Figure 1:
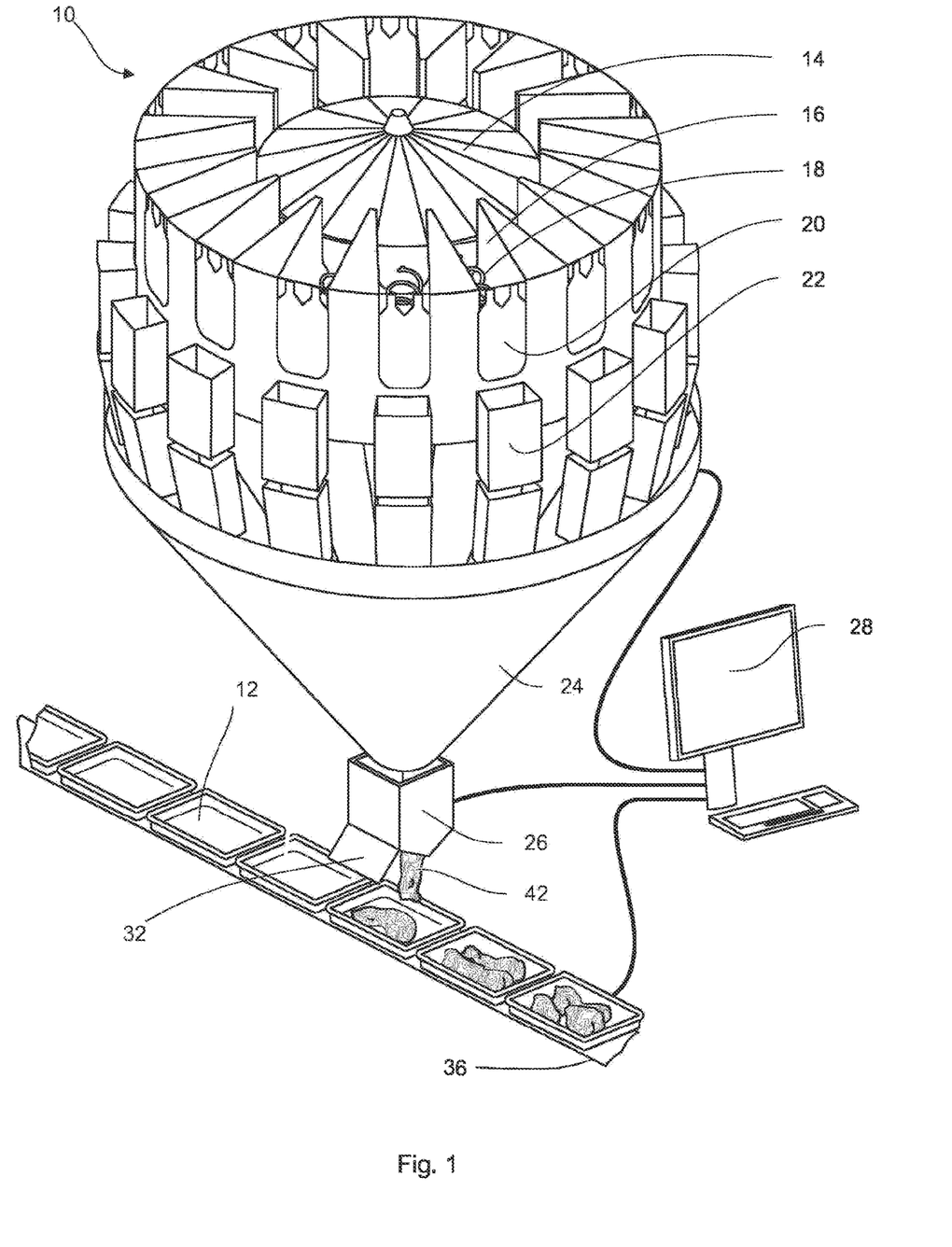
FIG. 1 illustrates a food batching system including a multihead weigher.

FIG. 1 shows a perspective view of a food batching system according to the present invention. The food batching system comprises a multihead weigher (10), and the operation of the food batching system is controlled by a control unit (28).

The multihead weigher (10) comprises a receiving section (14) for receiving solid food products (not shown) in bulk, i.e. the solid food products comprise a large amount of individual food products, typically meat products such as chicken, beef, pork, fish etc.

The solid food products are conveyed from the receiving section (14) into one of the trays (16). The trays (16) are located circumferentially around the receiving section (14).

Each tray (16) comprises a transport screw (18) for conveying the solid food products outwardly towards a lid (20) at an outlet of the tray. The lid opens and closes the outlet of the respective tray, and thereby controls the flow of the solid food products from the respective tray (16) into a respective weighing scale (22) located below the outlet of the respective tray.

Each weighing scale (22) is used to determine the weight of the solid food products located in the weighing scale (22).

Furthermore, the number of articles in a respective weighing scale is determined. Specific methods of determining the number of articles in a respective weighing scale are further described below.

As the weight and number of articles in the weighing scales have been determined, it is determined (using a control unit (28)), which weighing scales should have their contents combined.

The contents of those weighing scales, which should be combined into a batch, are then released into a chute (24) and collected in a dosing mechanism (26), which further releases the contents into a bin (12) via an accept gate (32).

The bin may have any form and be made of any material which is compatible with its function as receptacle for solid food products on a package conveyor. The bin may be an approximately rectangular tray formed item made of a plastic or alumina material suitable for storing food for human consumption.

In FIG. 1, a solid food product is shown falling down from the dosing mechanism into a batch.

As a bin has been filled with the desired contents, the control unit instructs the package conveyer (36) sequentially to move and bring an empty bin into position under the dosing mechanism and close the accept gate before a new portion of solid food products are released into the dosing mechanism.

Figure 2:
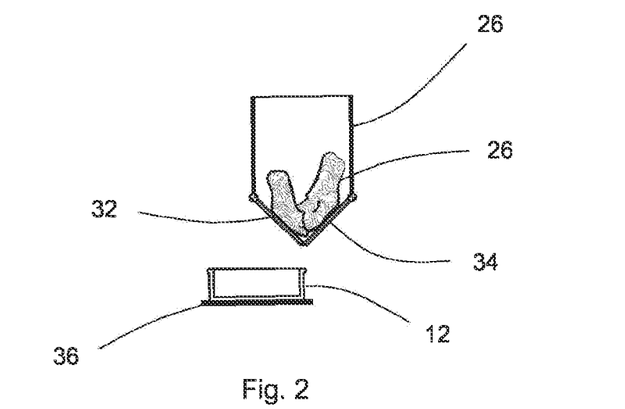
FIG. 2 illustrates a part of a food batching system with a dosing mechanism and a bin for collecting a batch.

FIG. 2 shows a dosing mechanism (26) containing a number of solid food products (42).

The dosing mechanism comprises an accept gate (32) and a reject gate (34). Both of these gates are controlled by the control unit (28).

Also shown is an empty bin (12) placed on top of a package conveyor (36).

The dosing mechanism has two pieces of solid food products.

Figure 3:
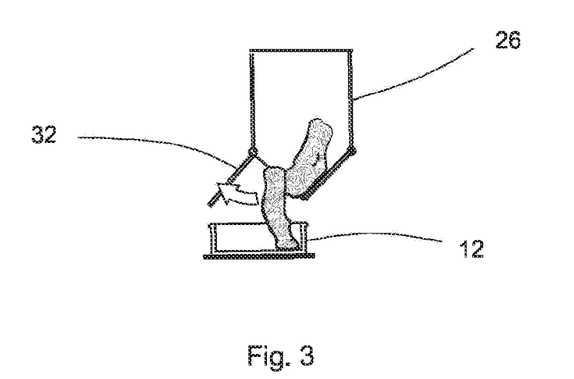
FIG. 3 illustrates a part of a food batching system with a dosing mechanism in an accept state.

FIG. 3 shows the dosage mechanism (26) after having received an instruction for the opening of the accept gate (32) from the control unit. The opening result in that the solid food products are released into an empty bin (12).

Figure 4:
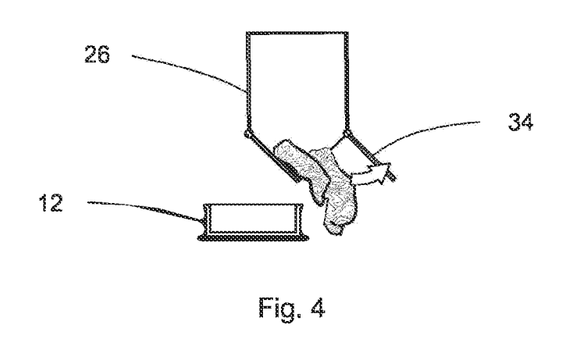
FIG. 4 illustrates a part of a food batching system with a dosing mechanism in a recycle or reject state.

FIG. 4 shows the dosage mechanism (26) after having received an instruction for the opening of the reject gate (34) from the control unit. The opening results in that the solid food products are released to a different position than the empty bin (12) on the package conveyer (36).

A collection of solid food products having a weight inside an overlap between a first weight distribution and a second weight distribution may be recycled and via a feeder system (not shown) and moved into the receiving section (14) of the multihead weigher (10).

However, a collection of solid food products having a weight outside all of the distributions may be disposed of, and used for other purposes.

Figure 5:
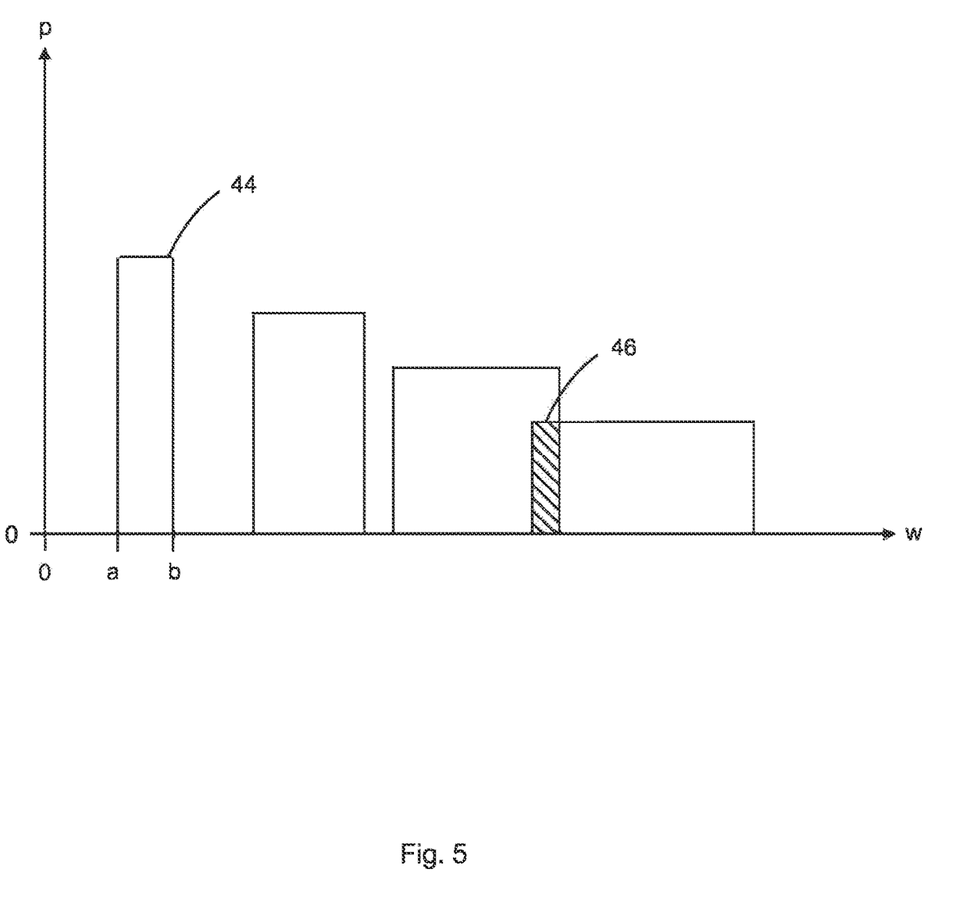
FIG. 5 illustrates a set of weight distributions representing the weight distribution for 1, 2, 3 or 4 pieces of solid food products, respectively.

FIG. 5 illustrates a set of weight distributions for 1, 2, 3 or 4 pieces of solid food products, respectively.

The weight distributions are the non-cumulative probability distributions. The weight w is along the abscissa axis, and the point probability p is along the ordinate axis.

Thus, the first weight distribution (44) represents the non-cumulative probability distribution $p_1$ for one piece of solid food product such as a chicken leg.

Each weight distribution is a uniform distribution.

For example, the first distribution (44) is truncated, and has a point probability of 0 below a minimum weight value (min(w)=a), which means that the probability of observing an outcome with a weight below the minimum weight value a is 0:

$$P_1(a) = \int_0^a p_1 dw = 0$$

The point probability is also 0 above a maximum weight value max(w)=b. The point probability is constant between the minimum weight value a, and the maximum weight value b.

The distribution for one piece of solid food product may be written as unif(a;b). Specific weights may be a=27 g and b=37 g.

Thus, it is assumed that pieces of solid food products such as chicken legs do not have any cases/observations, where a chicken leg weighs less than the minimum weight value, and also no cases/observations, where a chicken leg weighs more than the maximum weight value, and in between the minimum and maximum weight values, the weights of the chicken legs are evenly distributed.

In the example of FIG. 5, all of the distributions are normalized, which means that the height of the distributions decreases along the abscissa axis, and the width of the distributions increases along the abscissa axis.

The normalized version of the first distribution may be written as:

$$p_1 = \frac{1}{b-a} unif(a;b)$$

The point probability of a weight w is:

$$p_1(w) = \begin{cases} \frac{1}{b-a} & \text{if } a < w < b \\ 0 & \text{if } w < a \\ 0 & \text{if } w > b \end{cases}$$

For a normalized distribution, the integral from the minimum weight value a to the maximum weight value b gives a probability of 1:

$$p_1(a;b) = \int_a^b P_1 dw = 1$$

The second distribution may be found by assuming that two pieces of solid food product weighing at the minimum weight a, may be observed in the same weighing pan resulting in a minimum weight of 2*a.

Similarly, two pieces of solid food product weighing at the maximum weight b, may be observed in the same weighing pan resulting in a maximum weight of 2*b.

Also assuming that second distribution is uniform means that it can be written in non-normalized form as:

$p_2$=unif(2*a;2*b),

Similarly, the third and fourth distributions may be written as:

$p_3$=unif(3*a;3*b)

$p_4$=unif(4*a;4*b)

There is a gap between the first and second distribution, i.e. the maximum weight value of the first distribution is smaller than the minimum weight value of the second distribution. Mathematically speaking, the values are such that b<2*a, and the gap have a width of 2*a-b.

Similarly, there is a gap between the second and third distributions: 2*b<3*a.

The third and fourth distributions have an overlap (46) (shown as the hatched area), i.e. the maximum weight value of the third distribution is greater than the minimum weight value of the fourth distribution: 3*b>4*a, the overlap having a width of 4*a-3*b.

The number of solid food products in a weighing pan may be determined using the set of distributions.

For the present example, it may be assumed that between 1 and 4 pieces of solid food products is expected to land in a weighing pan. The weighing pan outputs a weight of the mass in the weighing pan, and it is to be determined how many pieces of solid food products are in the weighing pan.

An if-statement may be used to determine if the weight is a weight that occurs in a given distribution.

Thus, if the weight is greater than the minimum weight value for a distribution and less than the maximum weight value for the distribution it may be concluded that the weight belongs to that distribution—since that distribution has been defined for a specific number n of solid food products, it may be concluded that the number of solid food products in the weighing pan corresponds to that specific number.

Starting from the first distribution the algorithm may be:

if a<w<b then n=1

If the weight does not fall between the minimum weight value and the maximum weight value, it may be concluded that the weight does not belong to that particular distribution, i.e. the number n of solid food products in the weighing pan still being unknown.

In such a case, the algorithm may continue, and the weight may be compared to the second weight distribution:

if $2*a<w<2*b$ then $n=2$

And so on up to the fourth distribution.

If the algorithm returns a unique result, i.e. the weight falls within one of the distributions it was compared to, the number of solid food products in the weighing pan equals the number of the weight distribution.

If none of the comparisons return a positive result, it may be concluded that the weight falls outside the distributions. This may be the case if the contents in the weighing pan is half of a chicken leg for example. The contents of the weighing pan is then rejected through the reject gate.

If the weight falls in an overlap between two distributions, two of the comparisons return a positive result. For example, if the weight falls in the overlap between the third and fourth distribution, it cannot be determined if the contents in the weighing pan is three of four pieces of solid food products.

In such a case, the contents of the weighing pan may be recycled.

Figure 6:
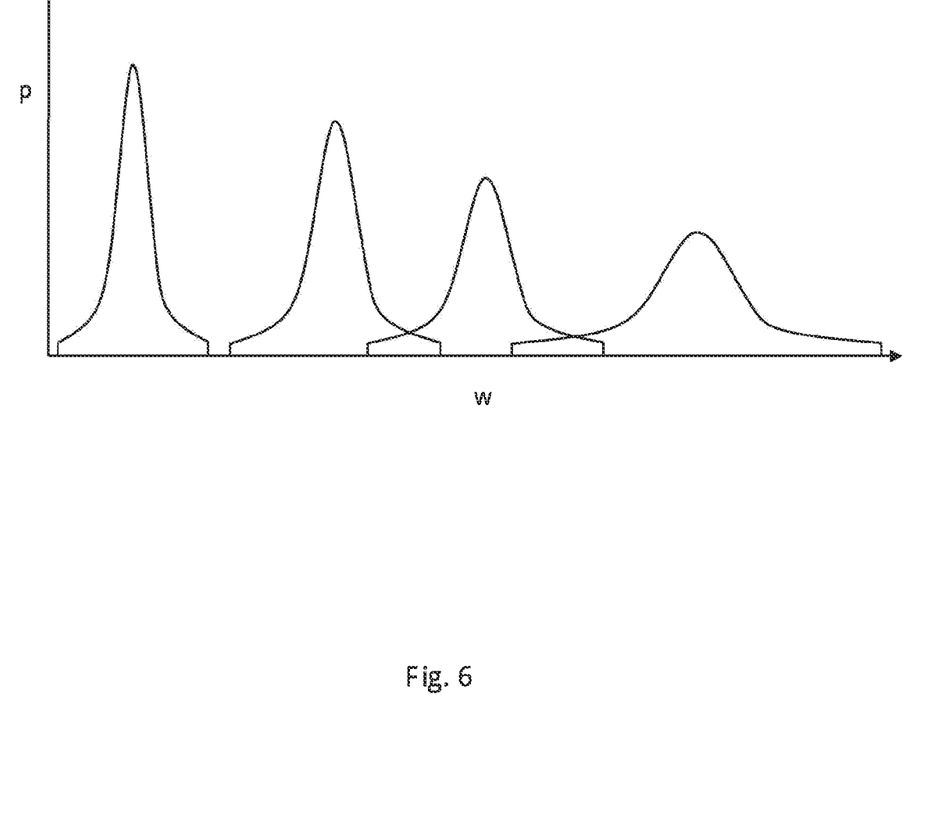
FIG. 6 illustrates a set of weight distributions representing the weight distribution for 1, 2, 3 or 4 pieces of solid food products, respectively.

FIG. 6 illustrates another set of possible weight distributions of batches consisting of 1, 2, 3 or 4 pieces of solid food products, respectively.

The weight distributions are the non-cumulative probability distributions. The weight w is along the abscissa axis, and the point probability p is along the ordinate axis.

Instead of having uniform distributions, it is now assumed that the distributions are truncated normal distributions (or bell distributions), i.e. the point probability is highest at the centre of each distribution and decreases symmetrically moving away from the centre, although the distributions may not necessarily be symmetric around the centre.

There is a gap between the first and second distribution, and an overlap between the second and third distributions as well as between the third and fourth distributions.

The if-statement described in connection with FIG. 5 may be used to determine if a weight falls within one of the distributions.

Alternatively, the point probability may be used to determine if a weight falls within one of the distributions. For example, in an overlap between two distributions it may be determined which distribution returns the highest point probability, and decided that the weight belongs to that distribution:

if $p_2(w)>p_3(w)$ then $n=2$ else if $p_2(w)<p_3(w)$ then $n=3$

In general, the point probability of a weight for all of the distributions may be determined, and compared to each other, and it can be decided that the weight belongs to the distribution with the highest point probability.

Instead of truncated normal distributions it is contemplated that non-truncated bell distributions may be used. In such a case, all of the distributions may overlap each other. However, minimum and maximum values for each distribution may be defined in order to define intervals, which the measured weights may be compared with—in essence turning the non-truncated distributions into truncated ones.

Figure 7:
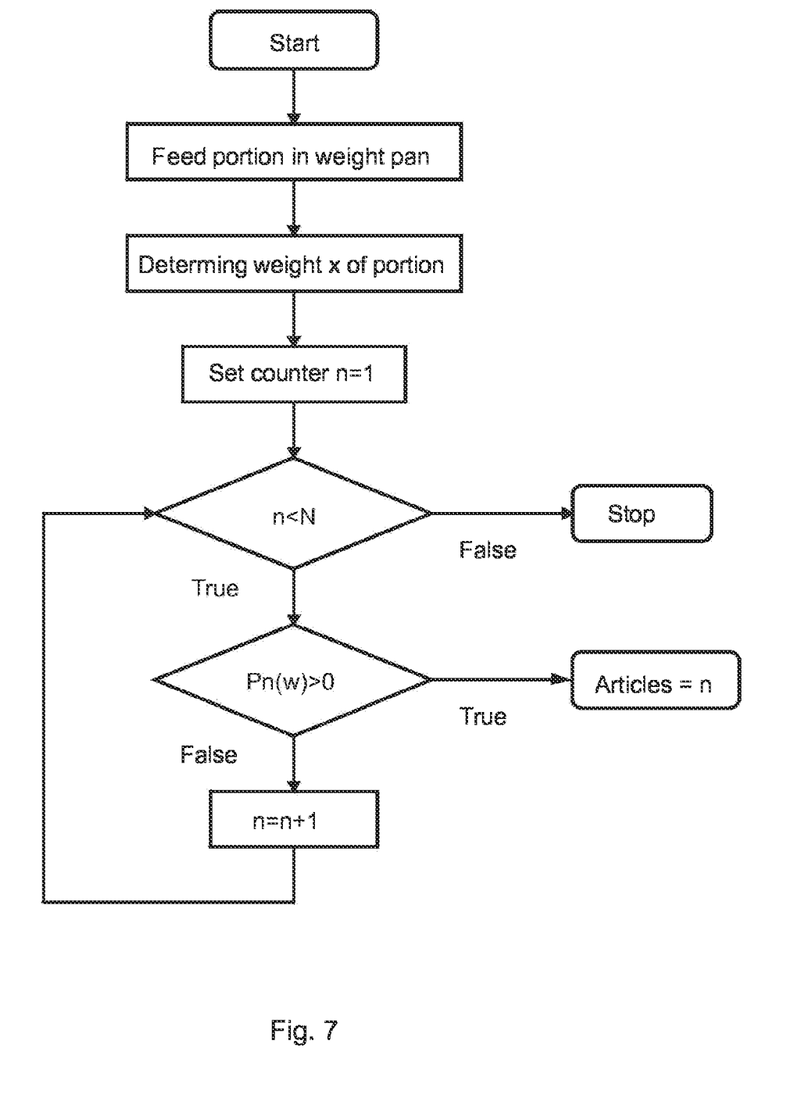
FIG. 7 is a flow chart illustrating a flow in the weighing and batching method.

FIG. 7 is a flow chart of the basic steps in the method of the invention including a possible algorithm for the estimation of food product articles in each batch.

Instead of using an if-statement, it is contemplated that the probability of the weight for each distribution may be determined. The number of pieces of solid food product corresponds to the number of the distribution returning a probability greater than zero—the algorithm is for uniform distributions with no overlap.

The algorithm starts by feeding a random and unknown number of solid food products into a weighing pan.

The weight of the mass in the weighing pan is then determined.

A counter may be used to keep track of the distributions, and the algorithm may start with the first distribution and correspondingly set the counter to 1.

In order to run through the distributions, a while-loop is used (repeating if-statement), which runs repeatedly based on a given Boolean condition, i.e. it runs until the counter reaches a maximum value of N, which corresponds to the total number of distributions in the set of distributions.

When the counter is below the maximum number, the algorithm goes into the while-loop, and determines the probability of the weight belonging to the first distribution, and decides if the probability is greater than zero.

If the probability is greater than zero, the while-loop is exited, and the number of solid food products in the weighing pan is 1.

If the probability is zero, the counter is increased with 1, and the while-loop continues determining the probability of the weight belonging to the second distribution, and decides if the probability is greater than zero.

If the while-loop runs through all of the distributions without positively determining the number of articles in the weighing pan, it may be decided to reject the contents of the weighing pan.

Below is a list of reference signs used in the detailed description of the invention and in the drawings referred to in the detailed description of the invention.

a Minimum weight value
b Maximum weight value
10 Multihead weigher
12 Bin
14 Receiving section
16 Tray
18 Transport screw
20 Lid
22 Weighing scale
24 Chute
26 Dosing mechanism
28 Control unit
32 Accept gate
34 Reject gate
36 Package conveyor
42 Solid food product
44 First weight distribution
46 Overlap

The invention claimed is:

1. A method of weighing and batching articles, said method comprising:
    providing a multihead weigher including
        a feeder system having an inlet for receiving said articles and a plurality of outlets for discharging said articles,
        a plurality of weighing pans, each of said weighing pans being positioned below a respective outlet of said plurality of outlets with an opening facing said respective outlet for receiving a portion of said articles, said method further comprising:
defining a set of weight distributions including a first weight distribution and a second weight distribution, said first weight distribution representing a weight distribution of a first integer number of articles, and said second weight distribution representing a weight distribution of a second integer number of articles,
providing said articles and feeding said articles into said weighing pans by means of said feeding system such that each weighing pan receives said portion of said articles,
determining the weight of a first portion in a respective weighing pan,
determining the number of articles constituting said first portion by performing a comparison between the weight and said first weight distribution, and said second weight distribution respectively, the number of articles corresponding to said first integer number when the weight being inside said first weight distribution, and to said second integer number when the weight being inside said second weight distribution, and
performing one of three actions:
a) rejecting said first portion when the weight being outside said set of weight distributions,
b) releasing said first portion from said respective weighing pan for recycling or for batching said first portion into a batch when the weight being inside said set of weight distributions such that said batch having a number and weight of articles within defined weight and integer intervals; or
c) recycling said first portion into said feeder system when the weight being inside an overlap between said first weight distribution and said second weight distribution.

2. The method according to claim 1, wherein the method also comprises accepting and batching said first portion when the weight being inside said first weight distribution or said second weight distribution and outside an overlap between said first weight distribution, and said second weight distribution.

3. The method according to claim 1, wherein said set of weight distributions comprises a uniform distribution.

4. The method according to claim 1, wherein said comparison comprises a conditional operation.

5. The method according to claim 1, wherein the weight being inside said first weight distribution when the weight falling above a minimum weight of said first weight distribution and below a maximum weight of said first weight distribution.

6. The method according to claim 1, wherein the weight being outside said first weight distribution when the weight being below a minimum weight of said distribution or above a maximum weight of said first weight distribution.

7. The method according to claim 1, wherein said comparison comprises determining the point probability of the weight for said first weight distribution, and said second weight distribution.

8. The method according to claim 7, wherein the weight being inside said first weight distribution when said point probability of the weight being above a threshold value such as 0.

9. The method according to claim 7, wherein the weight being outside said first weight distribution when said point probability of said weight being below a threshold value.

10. A multihead weigher for weighing and batching articles, said multihead weigher comprising:
a feeder system having an inlet for receiving said articles and a plurality of outlets for discharging said articles,
a plurality of weighing pans, each of said weighing pans being positioned below a respective outlet of said plurality of outlets with an opening facing said respective outlet for receiving a portion of said articles, and each of said weighing pans having a weight for weighing said portion of said articles,
a central controller having a database with a set of weight distributions including a first distribution and a second distribution, said first weight distribution representing a weight distribution of a first integer number of articles, and said second weight distribution representing a weight distribution of a second integer number of articles,
said central controller being configured for determining the number of articles constituting said first portion by performing a comparison between the weight and said first weight distribution, and said second weight distribution respectively, the number of articles corresponding to said first integer number when the weight being inside said first weight distribution, and to said second integer number when the weight being inside said second weight distribution,
a rejector for rejecting said first portion when the weight being outside said set of weight distributions,
a releasing mechanism for releasing said first portion from said respective weighing pan for recycling or batching said first portion into a batch when the weight being inside said set of weight distributions such that said batch having a number of articles within defined weight and integer intervals; and
a recycler for recycling said first portion into said feeder system when the weight being inside an overlap between said first weight distribution and said second weight distribution.

11. The multihead weigher according to claim 10, wherein the multihead weigher further comprises a dosing mechanism with an accept gate and a reject gate.

12. The method according to claim 2, wherein said set of weight distributions comprises a uniform distribution.

* * * * *